United States Patent
Gulen

(10) Patent No.: US 8,281,565 B2
(45) Date of Patent: Oct. 9, 2012

(54) REHEAT GAS TURBINE

(75) Inventor: Seyfettin Can Gulen, Niskayuna, NY (US)

(73) Assignee: General Electric Company, Schenectady, NY (US)

( * ) Notice: Subject to any disclaimer, the term of this patent is extended or adjusted under 35 U.S.C. 154(b) by 195 days.

(21) Appl. No.: 12/580,399

(22) Filed: Oct. 16, 2009

(65) Prior Publication Data

US 2011/0088404 A1 Apr. 21, 2011

(51) Int. Cl.
*F02C 6/00* (2006.01)

(52) U.S. Cl. ...................... 60/39.182; 60/736

(58) Field of Classification Search ............... 60/39.182, 60/39.5, 39.511, 736, 641.8, 806
See application file for complete search history.

(56) References Cited

U.S. PATENT DOCUMENTS

| | | | |
|---|---|---|---|
| 2,717,491 A * | 9/1955 | Barr | 60/785 |
| 4,167,856 A * | 9/1979 | Seidel et al. | 60/641.14 |
| 4,754,607 A * | 7/1988 | Mackay | 60/723 |
| 4,942,736 A * | 7/1990 | Bronicki | 60/641.12 |
| 5,417,052 A * | 5/1995 | Bharathan et al. | 60/783 |
| 6,145,295 A * | 11/2000 | Donovan et al. | 60/783 |
| 6,244,039 B1 | 6/2001 | Sugishita et al. | |
| 6,543,214 B2 * | 4/2003 | Sasaki et al. | 60/39.5 |
| 6,601,391 B2 | 8/2003 | Alexander | |
| 6,666,027 B1 | 12/2003 | Cardenas, Jr. | |
| 7,287,381 B1 | 10/2007 | Pierson et al. | |
| 7,581,395 B2 | 9/2009 | Takeuchi et al. | |
| 2002/0066265 A1* | 6/2002 | Tsuji | 60/39.182 |
| 2005/0121532 A1* | 6/2005 | Reale et al. | 237/12.1 |
| 2009/0235634 A1* | 9/2009 | Wang et al. | 60/39.182 |

FOREIGN PATENT DOCUMENTS

| | | |
|---|---|---|
| JP | 04-076205 | 3/1992 |
| JP | 08-189310 | 7/1996 |
| JP | 2000-027662 | 1/2000 |
| JP | 2003-206750 | 7/2003 |

* cited by examiner

*Primary Examiner* — Phutthiwat Wongwian
(74) *Attorney, Agent, or Firm* — Cantor Colburn LLP

(57) ABSTRACT

A gas turbine system includes a compressor, an expander, a combustor disposed between the compressor and the expander, a boiler disposed between the compressor and the expander, a conduit including chargeable air and in thermal communication with the boiler and an external free heat source coupled to the boiler.

11 Claims, 3 Drawing Sheets

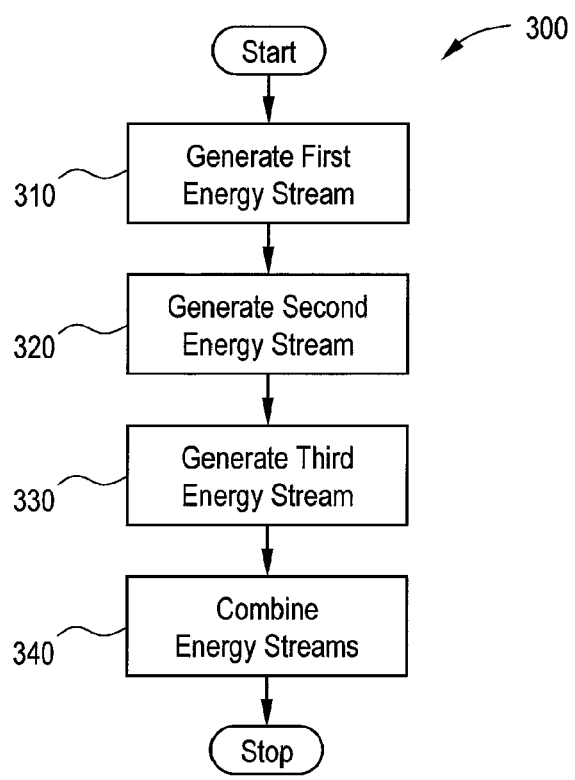

REHEAT GAS TURBINE

BACKGROUND OF THE INVENTION

The subject matter disclosed herein relates to the fossil fuel burning gas turbine engines, and, more particularly, to the utilization of a secondary source of free or waste energy, in addition to the primary fossil fuel energy source, to increase the overall conversion efficiency of the system.

In a gas turbine engine air is pressurized in a compressor and mixed with fuel in a combustor for generating hot combustion gases, which flow downstream to an expander, which extracts energy from the hot combustion gases. The temperature of the hot gas stream from the combustor of modern gas turbine engines is extremely high, typically well above 2500 degrees F. Such temperatures are comparable to or even higher than the melting point of the advanced alloys, which are used in the manufacture of turbine parts, e.g. nozzles or vanes (stationary), blades or buckets (rotating), and wheel spaces in between. These parts are commonly referred to as the hot gas path (HGP) components. Consider that, in the absence of cooling, the airfoils comprising the first stage of a modern gas turbine engine would melt away within a few seconds. Air used for cooling the HGP components in the gas turbine engine is typically extracted from the compressor discharge or inter-stage locations and is therefore not used in the combustion and turbine expansion process, and correspondingly decreases the overall efficiency of the gas turbine engine. The cooling air stream is referred to as "chargeable" airflow, the amount of which is controlled by the temperature of the pressurized air, which is channeled from the compressor to the turbine. In general, the further downstream the cooled turbine part in the expansion path, the further upstream is the coolant extraction point in the compressor. Mixing of the spent cooling air with the hot gas expanding through the turbine is a further source of lost work due to mixing and cooling losses.

In general, the energy input to the gas turbine via the heating value of the fuel burned in the combustor can be reduced by increasing the temperature of the fuel itself and/or the combustion air from the compressor discharge. The ensuing reduction in the amount of fuel burned in the combustor is reflected by the increase in gas turbine efficiency if a free/waste energy source is available to accomplish the said raise in the temperature of the fuel and/or combustion air. In modern industrial or heavy-duty gas turbines utilized in electric power generation, fuel gas performance heating (e.g. to 365 F or higher) using heat recovery boiler feed water is an established practice. Heating the compressor discharge air in a similar manner, while certainly possible in theory, is not feasible due to the very high temperature of the discharge air (e.g. nearly 800 F in advanced F-Class turbines) and the very closely integrated gas turbine structure.

Conventionally, e.g. in concentrated solar power (CSP) applications, free or waste energy is utilized for steam generation and power production in a steam turbine. For example, in the gas and steam turbine combined cycle (CC) power plant, the waste energy from the gas turbine exhaust is utilized to generate steam in a heat recovery steam generator (HRSG) for additional expansion and power generation in a steam turbine. Due to the relative position of the basic thermodynamic cycles representing the gas and steam turbines on a temperature-entropy surface, i.e. Brayton and Rankine cycles, respectively, the former is commonly referred to as the "topping" cycle and the latter as the "bottoming" cycle. In other systems, the steam generation in the HRSG of a CC power plant is supplemented by utilizing the (free) solar energy in a separate boiler section. In either case, the free or waste energy is utilized in the bottoming steam cycle of the CC power plant.

BRIEF DESCRIPTION OF THE INVENTION

According to an aspect of the invention, a gas turbine system is provided. The gas turbine system can include a compressor, an expander, a combustor disposed between the compressor and the expander, a boiler disposed between the compressor and the expander, a conduit including chargeable air and in thermal communication with the boiler and an external free heat source coupled to the boiler.

According to another aspect of the invention, a gas turbine system is provided. The gas turbine system can include a compressor, an expander, a combustor disposed between the compressor and the expander, and having an fuel supply, a first boiler disposed between the compressor and the expander, a conduit including chargeable air and in thermal communication with the first boiler, wherein the first boiler provides heat to the chargeable air, an external free heat source coupled to the first boiler and a second boiler that provides heat energy to the fuel supply.

According to a further aspect of the invention, a method is provided. The method can include generating a first energy stream in a gas turbine having a combustor, generating a second energy stream in the gas turbine, generating a third energy stream in a source external to the gas turbine and combining the third energy stream with the first energy stream to increase the heat energy in the first energy stream and the second energy stream.

These and other advantages and features will become more apparent from the following description taken in conjunction with the drawings.

BRIEF DESCRIPTION OF THE DRAWING

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

FIG. 3 illustrates a flow chart of a method for external-reheating in a gas turbine in accordance with exemplary embodiments.

The detailed description explains embodiments of the invention, together with advantages and features, by way of example with reference to the drawings.

DETAILED DESCRIPTION OF THE INVENTION

Figure 1:
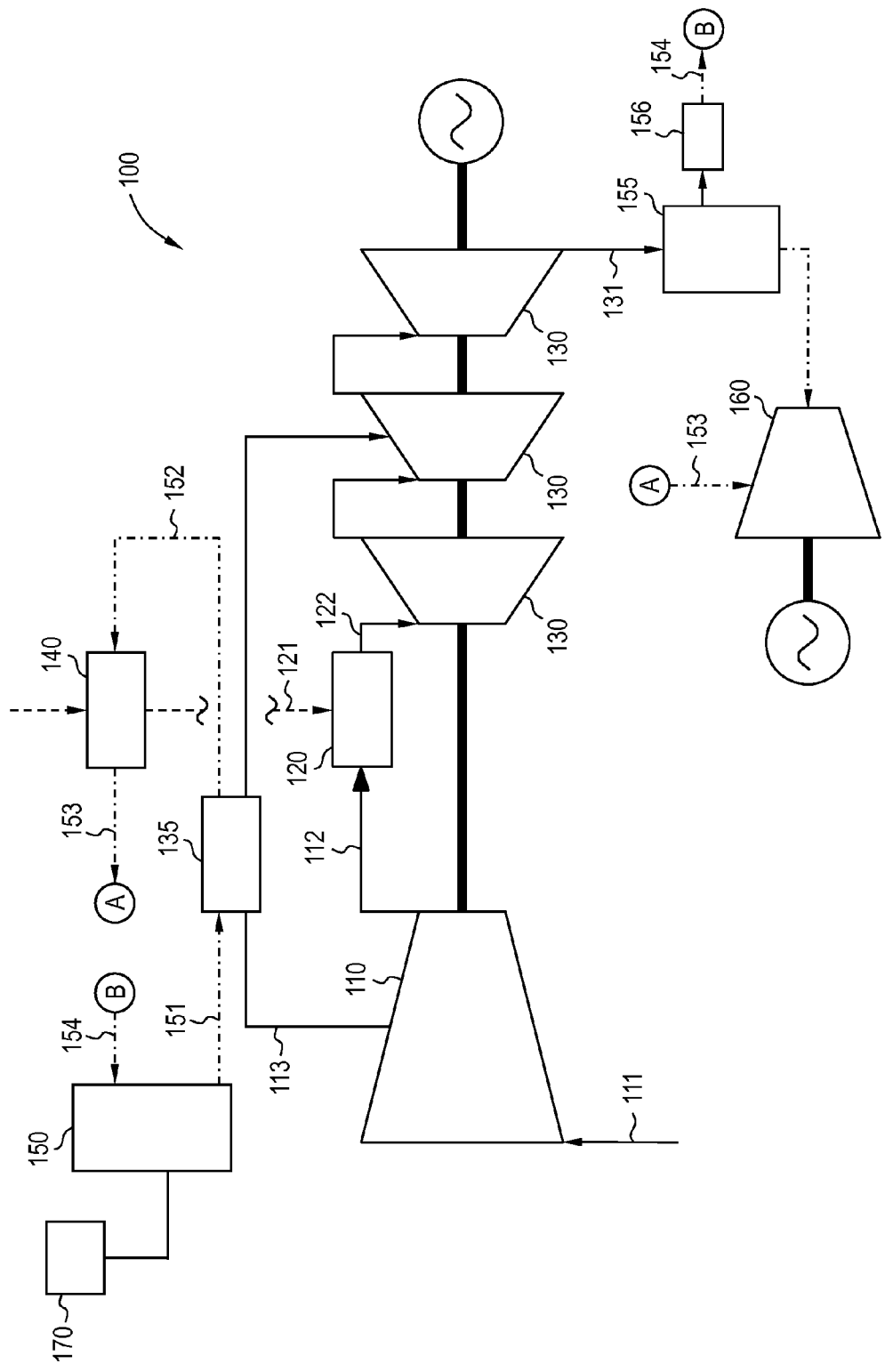
FIG. 1 illustrates an exemplary external-reheat gas turbine system in its preferred embodiment.

FIG. 1 illustrates an exemplary external-reheat gas turbine system 100. As further described herein, fundamental thermodynamics dictates that if it is possible to utilize the free or waste energy in the topping gas cycle of the CC power plant, the gain in the efficiency of the overall system will be higher due to the combination of two separate mechanisms: 1) improvement of the topping (gas turbine) cycle efficiency via reheat effect, which is well known and described in all elementary textbooks on the subject, and 2) improvement of the bottoming (steam turbine) cycle efficiency via increased energy (availability) of the gas turbine exhaust gas stream feeding the HRSG.

As described herein, in external-reheat gas turbine cycles, steam can be generated in a boiler 150 utilizing a free or waste heat source 170 and can be supplied to various parts of the system 100. In this context, the adjectives "free" and "waste" signify that no additional fossil fuel (purchased via capital expenditure) is utilized to generate the said energy. Examples are renewable sources such as solar energy, which is readily available anywhere in the world at no cost, and energy as a by-product of existing processes such as the exhaust gas from an internal combustion engine, which would otherwise be wasted via discharge into the atmosphere. The term boiler is used herein in its most generic sense to describe a heat exchanger that utilizes a source of heat to convert water into steam. The particular thermo-mechanical and other design aspects to achieve the said effect are immaterial to the invention. As further described herein, the boiler 150 can include a variety of heat sources for steam generation such as free solar energy, or waste sources such as molten slag product of a steel mill. It is understood that the terms "free" and "waste" are used interchangeably and are terms to describe a source of heat supplied external to the gas turbine. The "free" heat source (e.g. a concentrated solar power plant, solar collector field, waster-heat recovery from molten slag, etc.), via steam generated in the boiler 150, increases the temperature of the chargeable cooling flows. The steam can also be used to heat the gas turbine fuel thereby reducing the amount of fuel consumed in the combustor and increasing the gas turbine efficiency. The reheat effect created by the hot chargeable flow entering the gas turbine HGP increases efficiency and output of the system 100.

In the exemplary embodiment illustrated in FIG. 1, the system 100 includes a turbine compressor 110 that receives atmospheric air 111, and generates compressed air 112 and chargeable airflow 113, which can be in multiple streams. The compressor is operatively coupled to an expander 130. The compressed air 112 is generated for a combustor 120, and chargeable cooling air 113 is generated for the HGP components of the gas turbine expander 130. The combustor is disposed between the compressor 110 and the expander 130, receiving compressed air 112 from the compressor 110 and providing hot product gas 122 to the expander 130. The combustor 120 also receives a fuel supply 121. The system 100 further includes a gas turbine exhaust stream 131, which is amenable to a combined cycle (CC) configuration. In CC configuration, the system 100 can further include a HRSG 155 to recover the energy of the exhaust stream 131 and generate steam to power a steam turbine 160. The steam turbine 160 can include low, intermediate and high pressure sections as well as a condenser to condense exhaust steam for re-use in the HRSG 155. Many additional configurations can be implemented for re-use of the exhaust stream 131, and the HRSG 155 and steam turbine 160 are shown for illustrative purposes. In the exemplary embodiment illustrated in FIG. 1, an air heater 135 is disposed between and operatively coupled to the compressor 110 and the expander 130. The chargeable air 113 flows from the compressor 110, through the air heater 135, and to the expander 130 via external pipes or other suitable conduits. A supply conduit 151 and a return conduit 152 are disposed between the boiler 150 and the air heater 135 and between the air heater 135 and the fuel heater 140, respectively. The fuel heater 140 is disposed between the boiler 150 and the air heater 135, on the return conduit 152. The spent steam 153 from the fuel heater is sent to the steam turbine 160 to be admitted at a location commensurate with its pressure and temperature for further useful shaft power production. The boiler 150 is supplied with water 154 from the low pressure (LP) economizer 156 discharge of the HRSG 155 for steam production.

In the exemplary embodiment illustrated in FIG. 1, the chargeable cooling air 113 at its origin in the compressor 110 is typically around 400 F to 650 F. As described herein, the free or waste heat is utilized to heat the chargeable air 113 to increase the overall efficiency of the system 100. In particular, the chargeable cooling air 113 extracted from stages of the compressor 110 is heated to desirable temperatures (e.g., 800 to 1000 F) before entering the gas turbine expander 130 section using steam generated by utilizing the free or waste heat source 170 in the boiler 150 (e.g., molten slag from a steel mill or solar heat). As such, free energy can be introduced into the expanding gas (i.e. increase its enthalpy) for production of extra power during the remainder of the expansion. For example, in an advanced F-Class 165 MW heavy-duty industrial gas turbine, calculations indicate an extra ~800 kW (1300 kW) GT power output for 200 F (300 F) rise in chargeable cooling flow. This result can be accomplished by using 1050 F superheated steam that is generated in boiler 150 at, for example, 600 psia utilizing concentrated solar power. Furthermore, the increase in the gas turbine exhaust stream 131 temperature is 4 to 7 degrees F., which translates into additional bottoming cycle steam turbine output of 1200 kW to 2000 kW, respectively, in 2×1 CC configuration, i.e. two gas turbines and one steam turbine. Thus, in the exemplary system 100 described above, the net impact on the CC power output of an advanced F-Class gas turbine system in 2×1 configuration (nominal 510 MW) is 2.75 MW to 4.5 MW for 200 F and 350 F rise in chargeable cooling flow, respectively.

In the exemplary embodiment illustrated in FIG. 1, the spent steam from the cooling air heater 135 can be utilized to heat the gas turbine fuel 121 in fuel heater 140. For example, the spent steam from the cooling air heater 135 can be utilized to supplement the existing performance fuel heater (which utilizes the intermediate pressure (IP) economizer 156 feed water 154 from the HRSG 155) to increase the fuel temperature from, say, 365 F to 440 F. In addition, the spent steam from the cooling air heater 135 can be utilized to replace the entire fuel heating duty and thereby increasing the steam production in HRSG 155 and power production in the steam turbine 160. Furthermore, the spent steam 153 from the fuel heater 140 can be sent to the steam 160 to be admitted at a suitable location commensurate with its pressure and temperature. For example, for a 350 F rise in chargeable cooling flow, which can be accomplished in the air heater 135 by utilizing 600 psia and 1050 F steam 151 generated in the boiler 150, after the spent steam 152 from the air heater 135 is utilized in fuel heater 140 to increase the temperature of fuel supply 121 from 365 F to 440 F, ~550 F steam is available for admission at the bowl of the LP steam turbine section. This result can provide another 5 to 6 MW of additional shaft power production. In addition, the benefit of 75 F higher fuel temperature at the inlet to the combustor is about 0.15 percentage points in net CC efficiency. As such, for 350 F rise in chargeable cooling flow, which can be accomplished by 600 psia and 1050 F steam 151 generated in the boiler 150 in the air heater 135, a performance improvement of 9.5 to 10.5 MW (equivalent to more than 0.9 percentage points in net CC efficiency) and more than one percentage point in net CC efficiency is possible for a nominal 510 MW 2×1 CC power plant system. In addition, if spent steam 152 from air heater 135 is utilized in fuel heater 140 for the entire fuel heating, i.e. from the pipeline temperature to 365 F or higher, further efficiency increases are possible, which can result in higher steam production in HRSG 155 and higher power output in steam turbine 160 by replacing the exhaust gas energy previously diverted from the HRSG to accomplish the said fuel heating.

Figure 2:
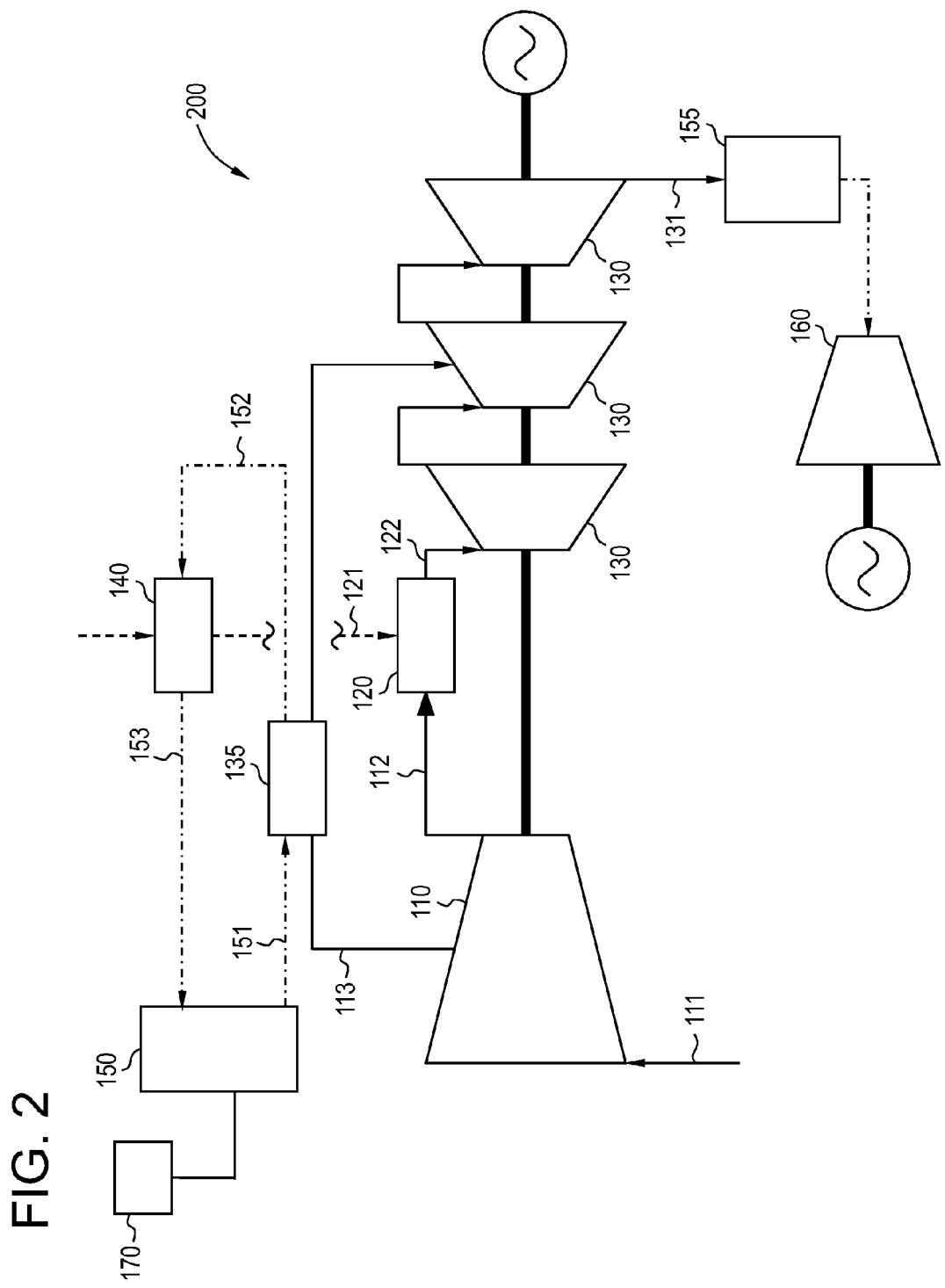
FIG. 2 illustrates another exemplary external-reheat gas turbine system.

In the exemplary embodiment illustrated in FIG. 2, steam is replaced by a commercially available heat transfer fluid. Thus, the boiler 150 becomes the heat exchanger 150, in which the said fluid's temperature is increased by absorbing the heat from the free or waste heat source 170. Once again, the particular thermo-mechanical and other design aspects of the heat exchanger 150 to achieve the said effect are immaterial to the invention. In the presence of heat transfer fluids that can be feasibly utilized at the temperatures required by the current invention, i.e. 900 F or higher, this embodiment would be fully equivalent to the preferred embodiment utilizing steam as the heat transfer medium between the free/waste heat source and the chargeable air 113 and fuel supply 121. Currently, the temperature capability of commercially available heat transfer fluids is limited to around 700 F. While this makes the practical implementation of the invention using them infeasible at the present time, future availability of heat transfer fluids with higher temperature range will make them viable alternatives to steam. Obviously, in the alternate embodiment in FIG. 2, additional power generation opportunity in the steam turbine 160 as described in the preceding paragraph is not present.

FIG. 3 illustrates a flow chart for a method 300 for external-reheating in a gas turbine in accordance with exemplary embodiments. In exemplary embodiments, the chargeable cooling air, which is extracted from an inter-stage location in the compressor and piped to the expander (turbine) casing is heated before the reentry location. This process constitutes free energy introduction to the gas turbine system, which is converted into useful shaft work during the remaining expansion downstream of the cooling air reentry location. At block 310 the system 100, 200 generates a first energy stream. In exemplary embodiments, the primary hot gas stream and corresponding chargeable airflows 113 are generated as the first energy stream. At block 320, the system 100, 200 generates a second energy stream. In exemplary embodiments, the second energy stream can be the exhaust stream 131. At block, 330, the system 100, 200 generates a third energy stream in a source external to the gas turbine. In exemplary embodiments, the third energy stream is heat in the form of steam generated by the external heat exchanger 150 from free or waste energy sources. At block 340, the system 100, 200 combines the first and third energy streams. In exemplary embodiments, the third energy stream is implemented to raise a temperature associated with the chargeable airflow 113 as described herein. As a result, a temperature associated with the exhaust stream 131 is also increased in response to a combination of the first and second energy streams. In exemplary embodiments, the first energy stream is compressed air 112 from the compressor 110, and the third energy stream raises a temperature associated with the compressed air. The first energy stream can also be heat in the fuel supply 121 for the combustor 120, and the third energy stream raises a temperature associated with the fuel stream 121.

The exemplary embodiments described herein provide improvements to both primary and heat recovery configurations in any combined cycle wherein a topping cycle working fluid is directly heated with available free energy, as well as a bottoming cycle that recovers and utilizes any remaining topping cycle engine exhaust energy not recovered to heat the topping cycle's pressurized working fluid, but having a higher temperature from the additional energy provided to the topping cycle form the free energy. Technical effects include an increase in conversion effectiveness of the system 100. The increased conversion effectiveness results from heat provided to the system 100 that generates useful power in two steps: 1) In the gas turbine (producing expansion work in the last turbine stage) and 2) In the bottoming cycle (i.e. steam turbine) via increased gas turbine While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. An external-reheat gas turbine system, comprising:
a compressor;
an expander;
an air heater disposed between the compressor and the expander;
a combustor disposed between the compressor and the expander;
a fuel heater coupled to the air heater via a return conduit;
a boiler disposed between the compressor and the expander;
a heat recovery steam generator (HRSG) having an economizer discharge that produces feed water, the HRSG coupled to and configured to supply the feed water to the boiler;
a conduit, including chargeable air supply to the expander, in thermal communication with the boiler and the air heater;
an external free heat source coupled to the boiler; and
a steam turbine coupled to the HRSG and the fuel heater, wherein the fuel heater is configured to supply spent steam to the steam turbine.

2. The system as claimed in claim 1 wherein the external free heat source is at least one of a renewable energy source and a waste energy source.

3. The system as claimed in claim 1 wherein the combustor includes a fuel supply.

4. The system as claimed in claim 3 wherein heat energy from the external free heat source heats the chargeable air.

5. The system as claimed in claim 4 wherein remaining heat energy from the external free heat source heats the fuel supply.

6. The system as claimed in claim 4 wherein the remaining heat energy from the external free heat source generates power in the steam turbine.

7. An external-reheat gas turbine system, comprising:
a compressor;
an expander;
an air heater disposed between the compressor and the expander;
a combustor disposed between the compressor and the expander, and having a fuel supply;
a boiler disposed between the compressor and the expander;

a heat recovery steam generator (HRSG) having an economizer discharge that produces feed water, the HRSG coupled to and configured to supply the feed water to the boiler;

a conduit, including chargeable air supply to the expander, in thermal communication with the boiler, wherein the boiler provides heat to the chargeable air;

an external free heat source coupled to the boiler;

a fuel heater coupled to the air heater via a return conduit and provides heat energy to the fuel supply; and a steam turbine coupled to the HRSG and the fuel heater, wherein the fuel heater is configured to supply spent steam to the steam turbine.

8. The system as claimed in claim 7 wherein the external free heat source is at least one of a renewable energy source and a waste energy source.

9. The system as claimed in claim 7 wherein the boiler includes spent steam.

10. The system as claimed in claim 9 wherein the spent steam provides heat energy to the fuel supply.

11. The system as claimed in claim 7 wherein remaining heat energy from the external free heat source generates power in the steam turbine.

* * * * *